United States Patent [19]

Bray

[11] 4,205,820
[45] Jun. 3, 1980

[54] CONTROL VALVES

[75] Inventor: Geddes A. Bray, Moston, England

[73] Assignee: Mather & Platt Limited, Parks Works, England

[21] Appl. No.: 874,595

[22] Filed: Feb. 2, 1978

[30] Foreign Application Priority Data

Jun. 10, 1975 [GB] United Kingdom ............... 24859/75

[51] Int. Cl.² ............................................. F16K 35/00
[52] U.S. Cl. ..................................... 251/94; 251/243; 251/280; 251/306; 74/520
[58] Field of Search ..................... 251/58, 89, 94, 231, 251/236, 243, 280, 305, 306, 308; 74/520

[56] References Cited

U.S. PATENT DOCUMENTS 4,044,996  8/1977  Kodaira ................................ 251/243

FOREIGN PATENT DOCUMENTS 1011150  11/1965  United Kingdom .
1216726  12/1970  United Kingdom ...................... 251/94

OTHER PUBLICATIONS

Thomas P. Goodman—Product Engineering Annual Handbook of Product Design of 1953, pp. F26, 27—Pub. date Nov. 1952.

Primary Examiner—Martin P. Schwadron
Assistant Examiner—G. L. Walton
Attorney, Agent, or Firm—Sughrue, Rothwell, Mion, Zinn and Macpeak

[57] ABSTRACT

An installation control valve preferably for use in a fire fighting installation has a pivotal valve disc with an axis spindle to which is connected a lever. A lever retaining mechanism co-operates with the lever and is releasably held to resist lever and so valve disc movement. An actuating means is operable under predetermined condition to release the lever retaining mechanism to permit lever and valve disc movement to effect valve opening.

25 Claims, 15 Drawing Figures

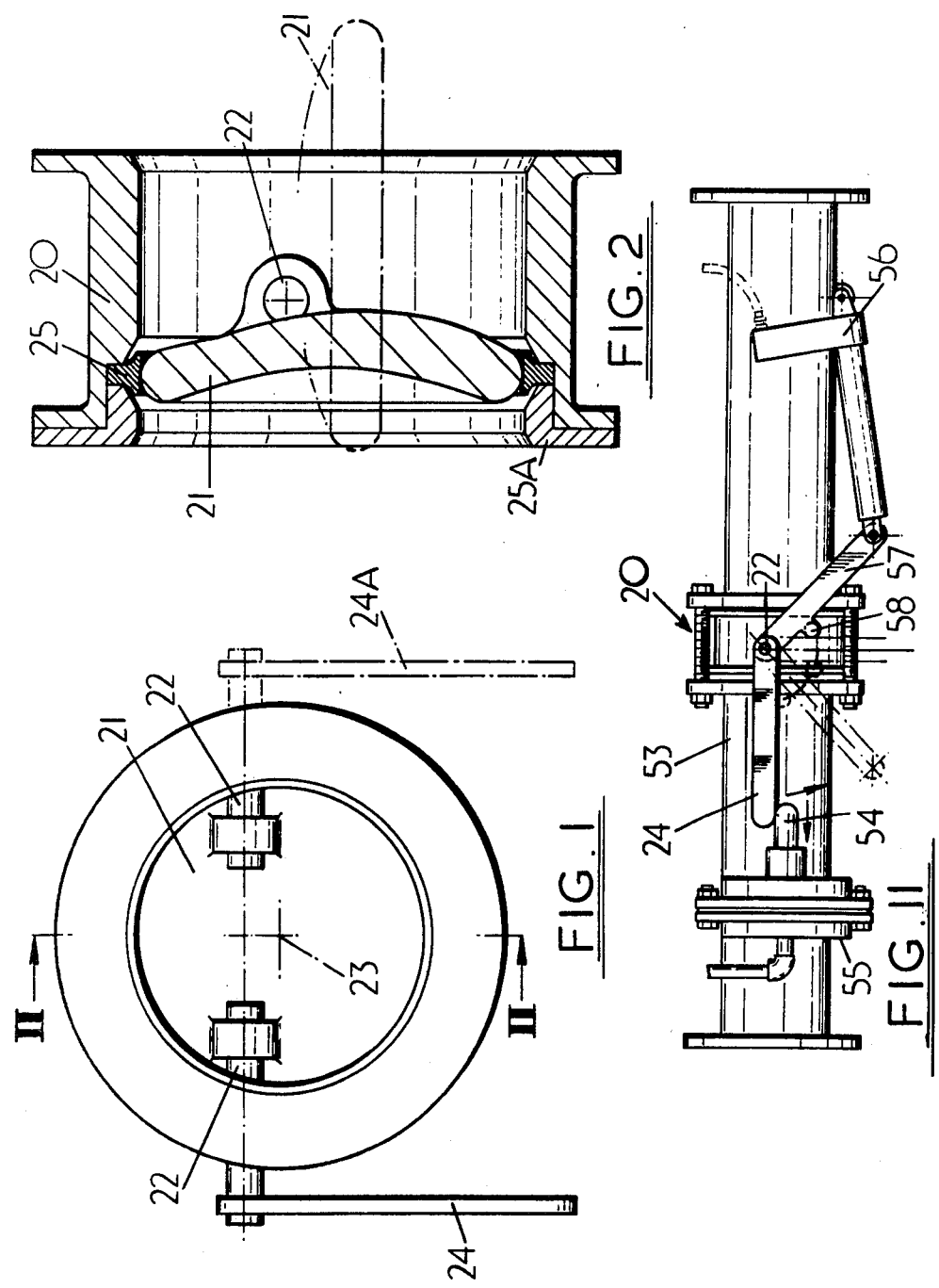

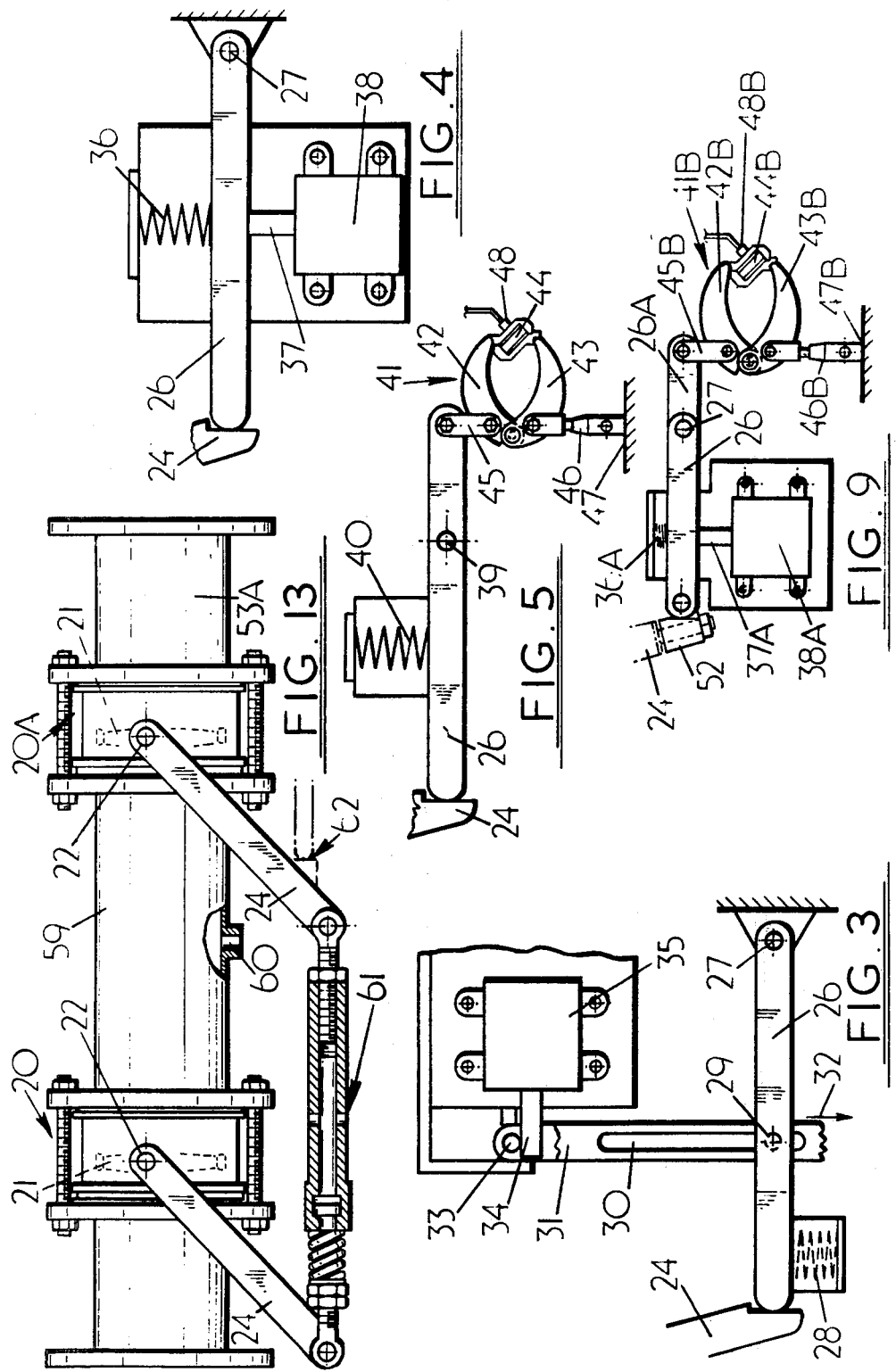

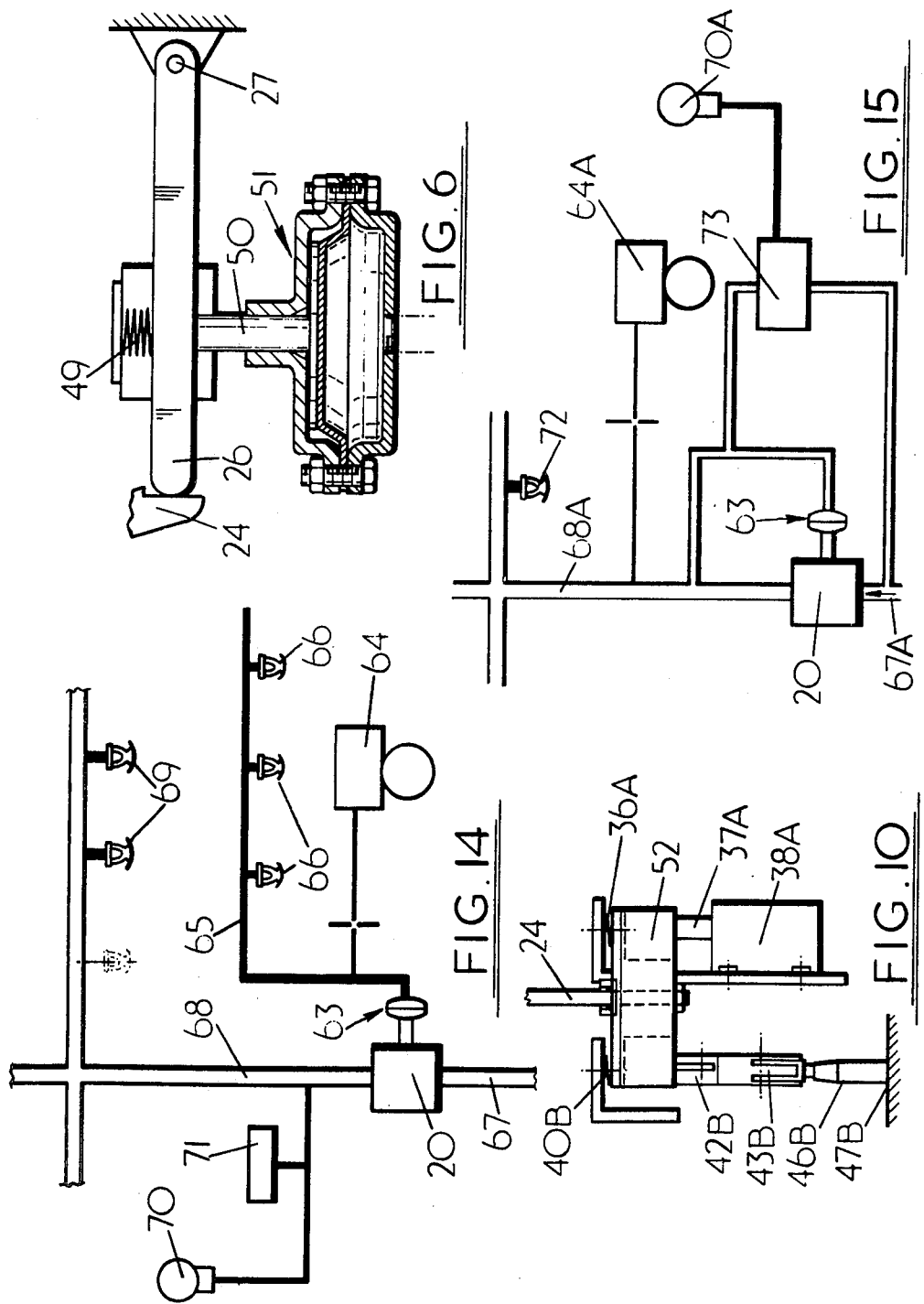

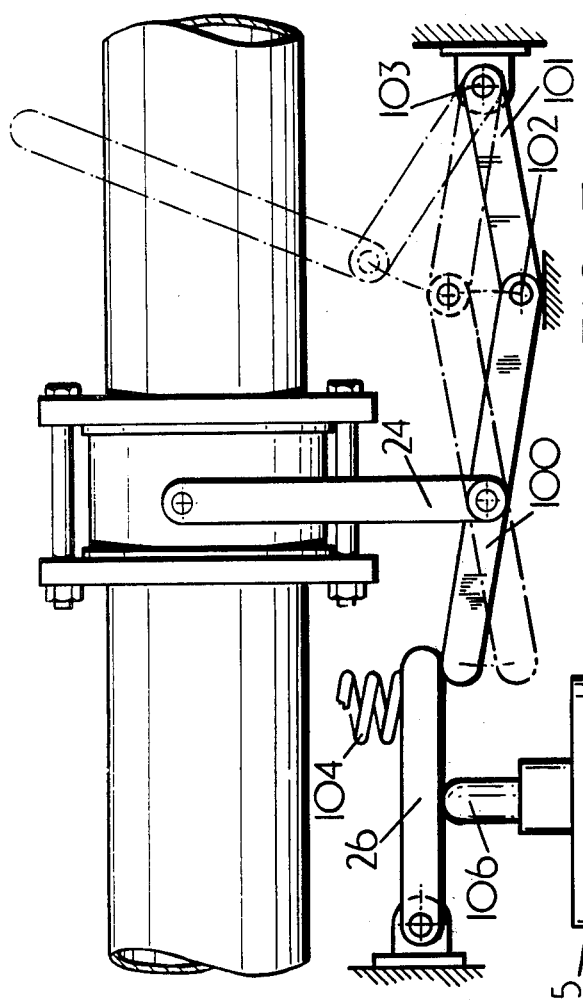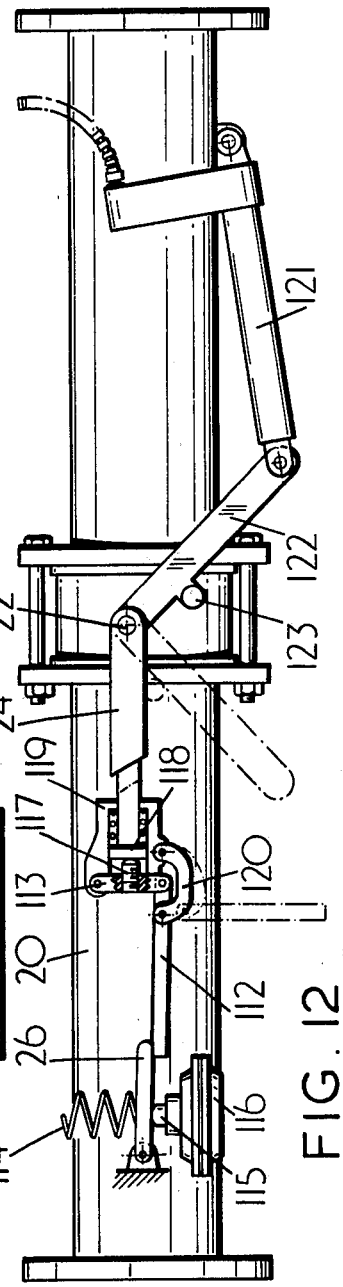

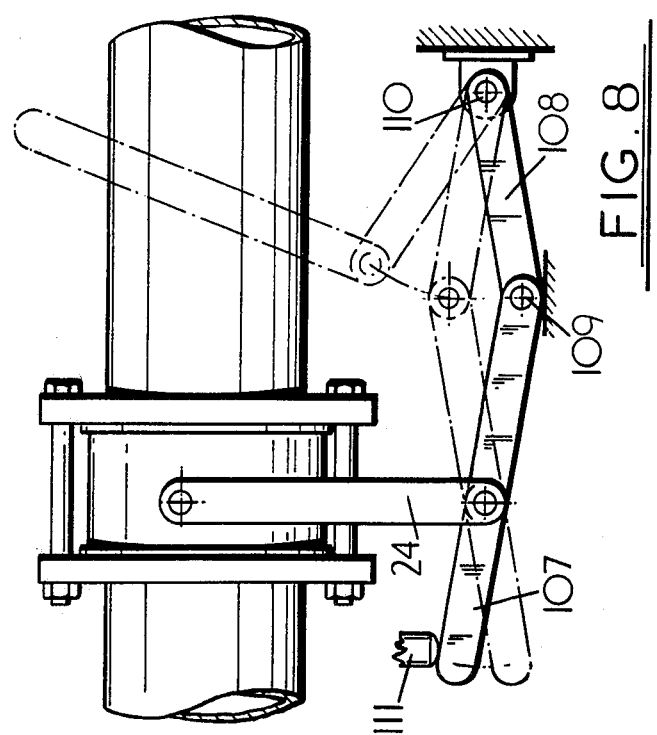

CONTROL VALVES

This invention relates to valves and in particular to installation control valves.

By "installation control valves" we mean valves which normally prevent fluid flow but which under a predetermined condition open to permit fluid flow.

An example of such a valve is one in a sprinkler or deluge installation which normally prevents water flow but which under fire or predetermined heat conditions opens to allow such flow. Another example is a valve normally preventing egress of inerting or suppressing fluid from a pressure vessel, which valve would be open under a predetermined condition to allow such egress.

It is an object of the present invention to provide an installation control valve adapted quickly to open under a predetermined condition.

According to the present invention there is provided an installation control valve comprising:

(i) a valve body;
(ii) a pivotal butterfly valve disc formed within the valve body;
(iii) a spindle rotatably mounted within the valve body with an end thereof extending outside the valve body, which spindle mounts the butterfly valve disc;
(iv) a lever connected to said end of the spindle;
(v) a retaining mechanism cooperable with the lever to resist movement thereof to maintain the butterfly valve disc closed against unequal pressure forces acting thereon on either side of said spindle;
(vi) and actuating means operable under a predetermined condition to cause the retaining mechanism to move and thereby release the lever for movement to permit said unequal pressure forces to open the butterfly valve disc.

Embodiments of the present invention will now be described, by way of example, with reference to the accompanying drawings, in which:

FIG. 1 is an end view of a control valve according to the present invention;

FIG. 2 is a sectional view on the line II—II of FIG. 1;

FIGS. 3 to 10 are diagrammatic views showing various forms of retaining mechanism and actuator arrangements;

FIG. 11 is a side view of a quick opening, slow closing control valve according to the invention;

FIG. 12 is a similar view to FIG. 11 showing a modification thereof;

FIG. 13 is a side view of a tandem control valve arrangement with a water lock feature; and FIGS. 14 and 15 are diagrammatic views of two firefighting deluge or sprinkler arrangements into which a control valve of the present invention can be incorporated.

In each embodiment of the invention, the valve is a butterfly type valve comprising a housing 20 in which is mounted a valve disc 21 of aerodynamic shape attached to a pivot spindle 22, which spindle 22 extends, as is customary, through a gland (not shown) in the housing 20 to the exterior of the housing and to which is secured one end of a lever 24.

The pivot spindle 22 may be attached off-centre relative to the valve axis 23 or may be on-centre thereto. In the latter alternative, the valve disc 21 must be loaded to an open condition but a loading may also be applied in the former alternative. In both these alternatives it can be seen that unequal pressure forces on either side of the spindle 22 on the valve disc 21 cause the valve to open.

It is envisaged that a second lever 24A can be secured to the other end of the spindle 22 which would permit two identical or different pivotal catch and actuator arrangements to act on the valve disc 21 which would prevent inadvertent opening of the control valve should, for some reason, one arrangement fail or operate prematurely. Alternatively two identical or different pivotal catch and actuator arrangements can act on the same lever.

A sealing ring 25 is secured in the housing 20 by a collar 25A, the valve disc 21 co-operating with the sealing ring when in its closed position. The sealing ring 25 shown is effective with pressure on either side of the valve disc 21. Alternative forms of sealing ring may be employed.

It will be manifest that if movement of the lever 24 and valve disc 21 is not positively prevented then due to the off-centre pivot the valve disc 21 will always tend to move to a valve open position due to fluid pressure thereon, which opening is assisted by its aerodynamic shape.

The following are different embodiments of various arrangements which positively prevent such lever and valve disc movement until a predetermined condition prevails. Such condition could, inter alia, be a fire, the attainment of a predetermined temperature, the attainment of a predetermined pressure or any other condition requiring opening of the control valve.

A common feature in all of the arrangements for holding the valve disc 21 positively in a closed condition is a lever 26 which forms part of a retaining mechanism.

In a first embodiment (FIG. 3), the catch lever 26 is urged into the path of the valve disc lever 24 by a slightly compressed spring 28. The catch lever 26 has an integral pin 29 intermediate its ends, which pin 29 engages in a slot 30 in a vertical lever 31 having at its lower end a weight signified by arrow 32. The upper end of the vertical lever 31 has a pin 33 normally supported by a plunger 34 operated by a solenoid 35.

The solenoid 35 is operated under a predetermined condition to retract the plunger 34 which allows the vertical lever 31 to fall due to the bottom weight 32 and this causes the catch lever 26 to pivot downwardly against the action of the spring 28 out of the path of the valve disc lever 24 so that the valve disc 21 can be pivoted open under fluid pressure.

An alternative weight arrangement is a weight on a cable incorporating a snatch loop or noose whereby on release of the cable from plunger 34 the weight falls and the snatch loop or noose fastens on the catch lever 26 and pulls it clear of the valve disc lever 24.

In a second embodiment (FIG. 4), the catch lever 26 is acted upon by a spring 36 in compression tending to move the catch lever 26 out of the path of the valve disc lever 24, which movement is normally resisted by a plunger 37 operated by a solenoid 38 so that retraction of the plunger 37 by the solenoid 38 allows the spring 36 to move the catch lever 26 out of the path of the valve disc lever 24.

In a third embodiment (FIG. 5), the catch lever 26 is pivoted intermediate its ends as indicated at 39 and a spring 40 in compression acts on the catch lever 26 with a view to moving it out of the path of the valve disc lever 24. The end of the catch lever 26 remote from the valve disc lever 24 has an arrangement which resists the action of the compressed spring 40 on the catch lever 26. This arrangement includes a fusible link device 41 comprising a pair of pivotally interconnected curved links 42, 43 which are held in closed loop relationship by a fusible element or a thermal sensitive bulb 44 such as that sold under the Registered Trade Mark "Quartzoid", the bulb 44 maintaining complementarily shaped formations of the links in engagement. The curved link 42 is connected by a short straight link 45 to the end of the catch lever 26 and the other curved link 43 is connected by a turn-buckle 46 to a stationary component such for example as the floor 47. A one-shot actuator 48 is also connected to the bulb 44, the actuator, in turn, being connected to a control panel (not shown).

On bursting of the bulb 44 either due to the attainment of a predetermined temperature or mechanically by the one-shot actuator 48 the closed loop defined by the curved links 42, 43 is broken which permits the spring 40 to act on the catch lever 26 and pivot it downwardly out of the path of the valve disc lever 24.

In a fourth embodiment (FIG. 6), again there is a spring 49 in compression acting on the catch lever 26 and tending to move it out of the path of the valve disc lever 24. This movement is resisted by a plunger 50 connected to a fluid diaphragm arrangement 51 as shown or to a piston (not shown). The diaphragm arrangement 51, or piston, is preferably pneumatically operated. On release of fluid from the diaphragm arrangement 51, or piston, the plunger 50 is retracted thus allowing the compressed spring 49 to act on the catch lever 26 and move it out of the path of the valve disc lever 24.

In a fifth embodiment (FIG. 7), the lever 24 is pivotally connected to a link 100 of an over-centre toggle linkage 100, 101 intermediate the ends of link 100. The end of link 101 remote from the pivot 102 of the linkage is pivotally anchored at location 103. The free end of link 100, when the valve is closed rests on the pivotal catch lever 26 and the pivot 102 rests on a stop. The pivotal catch lever 26 is urged by a spring 104 to a position where it causes the linkage 100, 101 to move to permit valve opening. Movement of the catch lever 26 is resisted by a diaphragm arrangement 105 or a piston arrangement. On release of fluid from the diaphragm arrangement 105, the plunger 106 is retracted and the spring 104 pivots the catch lever 26 to allow valve opening.

In a deluge installation as will be described later, an air pressure line normally communicates with the pneumatic release diaphragm arrangement 51 or 105, or piston arrangement, which line is a pipe work system around a fire risk fitted with sprinklers, operation of which under a fire condition releases the pressure and causes the control valve 20 to open to feed the water discharge nozzles on normal open pipe work connected to the valve 20.

In a sixth embodiment (FIG. 8), the lever 24 is pivotally connected to a link 107 of an over-centre toggle linkage 107, 108 intermediate the ends of link 107. The end of link 108 remote from the linkage pivot 109 is pivotally anchored at 110. The free end of link 107 rests on the plunger 111 of a solenoid. Actuation of the latter causes toggle linkage 107, 108 to move away from a stop towards the dotted line position thus permitting valve opening.

In a seventh embodiment (FIGS. 9 and 10), the valve disc lever 24 at its lower end is fitted with a swivel member 52 each end of which communicates with a separate catch lever 26, 26A having a common fulcrum 27, and has associated with it a different catch lever and actuator arrangement.

In the particular arrangement shown, the catch lever 26 is acted upon by the arrangement of FIG. 4, identical parts having the same references with the suffix "A", while the catch lever 26A is acted upon by the arrangement of FIG. 5, identical parts having the same references with the suffix "B".

It will be manifest that the solenoid 38A could be replaced by a fluid diaphragm arrangement such as 51.

It will be manifest that due to the provision of the swivel member 52 at the bottom of the valve disc lever 24 release of either arrangement will allow valve opening, the swivel member 52 disengaging from the non-operated arrangement.

It will be manifest that any combination of releasable catch lever and actuator arrangements may be employed in a dual arrangement.

Reference is now made to FIG. 11 in which the control valve 20 is shown disposed in a pipeline 53. In this instance, the valve disc lever 24 is retained by a plunger 54 to maintain the valve 20 closed. This plunger 54 is movable to release the valve disc lever 24 by a fluid operated diaphragm arrangement 55 operable when there is a fluid pressure drop on the downstream side of the valve 20, or when there is a fluid pressure drop in a separate closed detection pipework carrying detector pressure release means. The control valve 20 can be closed manually or alternatively automatically by detectors which, say, sense when a fire is extinguished or at least that the temperature is normal and which energise a motorised actuator 56 connected to the valve disc spindle 22 by a lever 57 which has an abutment 58 against which valve disc lever 24 rests. There is preferably a time delay between detaction and initiation of operation of the motorised actuator 56.

The motorised actuator may be replaced by a slowly rotating motor with limit switches directly secured to the valve disc spindle 22 or indirectly through a transmission, such as gearing.

The arrangement of FIG. 11 provides for quick opening and slow closing of the control valve 20, or for an automatic on/off sprinkler valve.

FIG. 12 shows a modification of the arrangement of FIG. 11. In this modification, a toggle linkage 112, 113, which can be moved from an over-centre position to a second position to permit valve opening, is acted upon by a catch and actuator arrangement similar to that shown in FIG. 6. This catch and actuator arrangement comprises, similar to that previously described, a catch 26 acted upon by a spring 114 which urges the catch 26 to move one end of one link 112 of the two pivoted links 112, 113 forming the toggle system. This movement is resisted by a plunger 115 of a fluid diaphragm 116 arrangement forming the actuator.

The second link 113 of the toggle system is provided with an abutment screw 117 which bears against one side of a spring loaded plunger 118 located within a cylinder 119. The cylinder 119 is fixed to the pipework close to the valve housing 20 and the link 113 is pivotally connected directly thereto whereas link 112 is pivoted to a C-shaped member 120 which is pivoted to the cylinder 119.

The plunger 118 projects from the cylinder 119 and, when the valve is closed bears directly on and retains the lever 24 against movement, the adjoining surfaces of the plunger 118 and the lever 24 being parallel but inclined to the vertical.

It will be manifest that on operation of the fluid diaphragm, the catch 26 is urged downwards by the spring and pushes said one end of the link 112 of the toggle system downwards also. This movement of the link causes the toggle system to move out of its stable over-centre position and thereby moves the abutment screw 117 out of engagement with plunger 118. The spring loading of the plunger 119 causes it to retract out of engagement with the lever 24 which is then free for movement as unequal pressure forces on either side of the spindle on the valve disc force the valve to open.

In a similar fashion to FIG. 21, a motorised actuator 121 is connected to the valve disc spindle 22 by a lever 122 which has an abutment 123 against which the lever 24 rests once the valve has opened. Operation of the actuator 121 after the valve has opened thus causes the valve to close. As previously described, the motorised actuator 121 may be replaced by a slowly rotating motor.

In FIG. 13 there are two control valves 20, 20A in the pipeline 53A so that there is a water lock 59 between the valves 20, a drain 60 to atmosphere being provided from the lock 59. The valve disc levers 24 are coupled by a crank and connecting rod 61. A catch lever and actuator arrangement partially shown at 62 and of any of the aforesaid constructions acts on one of the valve disc levers 24.

The valves function as linked back pressure valves with a drained length of pipe therebetween. Town water supply on the upstream side of the valves is completely isolated from possibly contaminated water downstream of the valves and any leakage from the downstream valve drains away via drain 60.

This tandem valve arrangement may be manually re-set, or alternatively a flow switch can be provided to cause slow closure of the valves when water flow through the pipeline ceases.

This arrangement can thus be used as an installation control valve with an anti-contamination characteristic.

It is conceivable that the valve disc could be loaded by, for example, a spring to open condition.

In FIG. 14, the control valve is indicated at 20 and the catch lever and actuator (say diaphragm arrangement 51) at 63. 64 is an air compressor and 65 an air-filled detector pipeline with sprinklers 66. The water line is 67, the pipework 68 above valve 20 being air-filled with open sprays 69. 70 is a hydraulically-operated alarm bell and 71 a pressure switch.

It will be manifest to those skilled in the art how this installation operates on a fire or high temperature being detected.

FIG. 15 shows another well-known fire-fighting installation incorporating control valve 20 and one of the catch lever and actuator arrangements 63.

Like parts to those in FIG. 14 have the same references with suffix "A". In this instance the sprays 72 are sealed and a water/air pressure, differential-area valve 73 operable to open on air pressure drop is provided.

Again the operation of this installation is well-known to those skilled in the art.

Such an arrangement may be linked with an air pressure loss detector device (an accelerator) which serves to open a passage when the air pressure drop is large, as when a sprinkler operates, to equalise air pressure or leak it to atmosphere as required.

What is claimed is:

1. A fire extinguishing installation control valve comprising:
   (i) a valve body for disposition in an installation pipework downstream of a pressurized source of extinguishant;
   (ii) a pivotal butterfly valve disc within the valve body and normally retained closed to prevent flow of extinguishant through the installation pipework;
   (iii) a sealing ring cooperable with a periphery of the valve disc and the valve body and effective with pressure on at least one side of the closed valve disc;
   (iv) a rotatable spindle pivotally mounting the valve disc within the valve body with an end thereof extending outside the valve body, which spindle is offset both radially and longitudinally of the point of intersection of a plane in which the periphery of the valve disc lies and the axis of the disc normal to said plane;
   (v) a lever connected to said end of the spindle;
   (vi) a retaining mechanism cooperable with the lever to resist movement thereof to maintain the valve disc closed against unequal pressure forces acting on either side thereof; and
   (vii) actuating means operable under a predetermined condition actuating said retaining mechanism to move and separate from said lever for movement to permit said unequal pressure forces to open the valve disc for free movement and allow extinguishant flow through the installation pipework.

2. A valve as claimed in claim 1 in which the valve disc is aerodynamically shaped.

3. A valve as claimed in claim 1 comprising a housing enclosing the valve disc which co-operates with the sealing ring.

4. A valve as claimed in claim 1, in which said butterfly valve disc is loaded to open condition.

5. A valve as claimed in claim 1 in which the valve retaining mechanism comprises a movable catch.

6. A valve as claimed in claim 5 in which the movable catch is a lever having a fulcrum at one end with its other end releasably urged into the path of movement of the valve disc lever.

7. A valve as claimed in claim 6 in which the catch lever is spring-urged into the path of the valve disc lever and is movable out of the path by a weight.

8. A valve as claimed in claim 6, in which the catch lever is spring-urged out of the path of the valve disc lever, there being a releasable mechanical impediment preventing such movement.

9. A valve as claimed in claim 1 in which the valve retaining mechanism is an over-centre toggle linkage.

10. A valve as claimed in claim 9 in which said lever is pivotally connected to the toggle linkage at a location spaced from the pivot axis of the latter.

11. A valve as claimed in claim 5 in which the valve retaining mechanism additionally comprises an over-centre toggle linkage cooperable with the movable catch.

12. A valve as claimed in claim 11 in which said lever is pivotally connected to the toggle linkage at a location spaced from the pivot axis of the latter.

13. A valve as claimed in claim 10 in which one end of the toggle linkage is pivotal about an anchor location, the actuating means being capable of acting on the other end of the toggle linkage to move it into a position permitting valve opening.

14. A valve as claimed in claim 11 in which one end of the toggle linkage is pivotal about an anchor location, the movable catch being capable of acting on the other end of the toggle linkage to move it into a position permitting valve opening.

15. A valve as claimed in claim 14 in which the movable catch is a lever having a fulcrum at one end with its other end releasably urged into the path of movement of said other end of the toggle linkage.

16. A valve as claimed in claim 15 in which the catch lever is spring-urged into the path of said other end of the toggle linkage, there being a releasable mechanical impediment preventing such movement.

17. A valve as claimed in claim 16 in which the toggle linkage abuts a spring loaded plunger against which bears the lever, movement of the toggle linkage allowing the plunger to be urged out of engagement with the lever thus permitting valve opening.

18. A valve as claimed in claim 17 in which each link of the toggle linkage is pivotally connected to a cylinder inside which the plunger is positioned, a projection of one link abutting the plunger.

19. A valve as claimed in claim 16 in which a power closure means is operatively associated with the spindle.

20. A valve as claimed in claim 5, in which the movable catch is a lever with a fulcrum intermediate its ends with one end releasably urged into the path of movement of the valve disc lever by a mechanical impediment operating on the other end of the catch lever.

21. A valve as claimed in claim 6, in which the valve disc lever has at its free end a swivel member on each end of which a spring-loaded catch lever and releasable mechanical impediment or actuator can act.

22. A valve as claimed in claim 1, in which the valve disc spindle has fast therewith the lever which co-operates with a catch in the form of a rectilinearly movable plunger, a power closure means being operatively associated with the spindle.

23. A valve as claimed in claim 1 in a pipeline section with a drained length of pipe therebetween, there being one movable catch provided to act on one of the valve disc levers.

24. A valve as claimed in claim 1 in a pipeline section with a drained length of pipe therebetween and with the valve disc levers connected for simultaneous movement, there being one movable catch provided to act on one of the valve disc levers.

25. A valve as claimed in claim 1 or 2, in which the sealing ring is secured in the valve body and is effective with pressure on either side of the valve disc.

* * * * *